United States Patent
Hermiller et al.

(10) Patent No.: US 8,408,358 B1
(45) Date of Patent: Apr. 2, 2013

(54) MORPHING RESONATORS FOR ADAPTIVE NOISE REDUCTION

(75) Inventors: Jason Michael Hermiller, Liberty Township, OH (US); Michael Richard Maddux, Jamestown, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 274 days.

(21) Appl. No.: 12/813,642

(22) Filed: Jun. 11, 2010

Related U.S. Application Data

(60) Provisional application No. 61/186,532, filed on Jun. 12, 2009.

(51) Int. Cl.
F02M 35/00 (2006.01)
(52) U.S. Cl. ........................................ 181/229; 181/293
(58) Field of Classification Search .................. 181/229, 181/293
See application file for complete search history.

(56) References Cited

U.S. PATENT DOCUMENTS

| | | | |
|---|---|---|---|
| 5,919,029 A | 7/1999 | Van Nostrand | |
| 6,182,787 B1 | 2/2001 | Kraft | |
| 6,508,331 B1 | 1/2003 | Stuart | |
| 6,698,390 B1 | 3/2004 | Kostun | |
| 6,782,109 B2 * | 8/2004 | Sheplak et al. | 381/191 |
| 6,792,907 B1 | 9/2004 | Kostun | |
| 6,915,876 B2 | 7/2005 | Ciray | |
| 7,117,974 B2 | 10/2006 | Moenssen | |
| 7,212,641 B2 | 5/2007 | Sheplak | |
| 7,510,052 B2 | 3/2009 | Ayle | |
| 2002/0000343 A1* | 1/2002 | Paschereit et al. | 181/229 |
| 2003/0141144 A1* | 7/2003 | Wilson | 181/292 |
| 2008/0066999 A1* | 3/2008 | Kostun et al. | 181/250 |
| 2008/0173271 A1* | 7/2008 | Prior et al. | 123/184.57 |
| 2011/0308884 A1* | 12/2011 | Melcher et al. | 181/280 |

* cited by examiner

Primary Examiner — Forrest M Phillips
(74) Attorney, Agent, or Firm — Dinsmore & Shohl LLP

(57) ABSTRACT

Tunable perforate acoustic liners are disclosed using shape memory materials, which allow the acoustic liners to tune for multiple frequencies across a wide range, unlike current designs which are limited to specific frequencies or small ranges. The liner will be initiated through a sensor and feedback loop to monitor the current acoustic environment and initiate geometry change needed to more effectively attenuate engine noise.

13 Claims, 4 Drawing Sheets

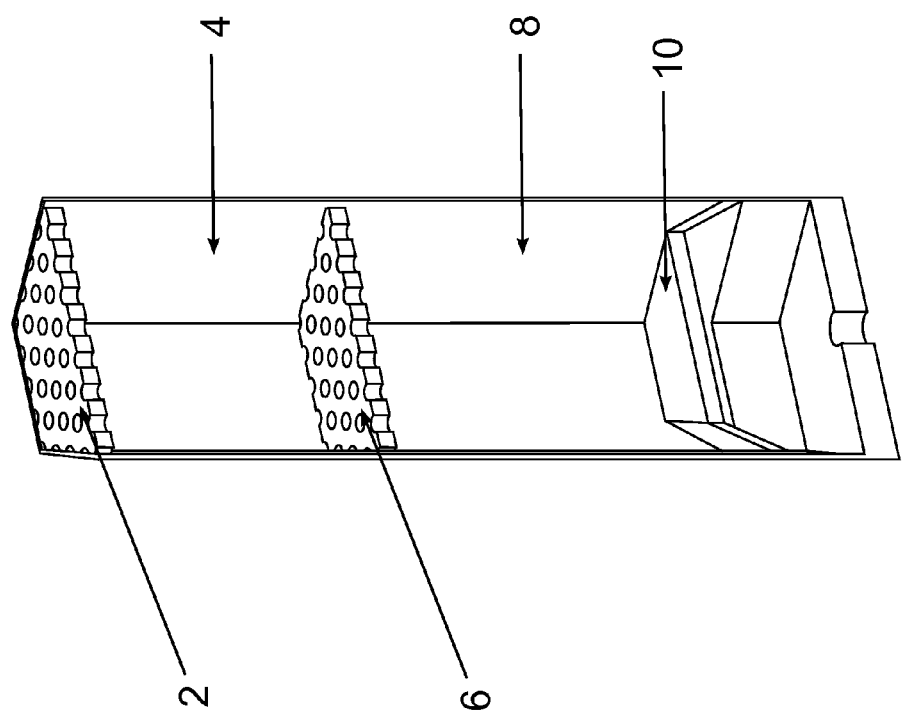

MORPHING RESONATORS FOR ADAPTIVE NOISE REDUCTION

CROSS REFERENCE TO RELATED APPLICATIONS

This application claims priority from U.S. Provisional Application Ser. No. 61/186,532 filed Jun. 12, 2009.

STATEMENT REGARDING FEDERALLY SPONSORED RESEARCH OR DEVELOPMENT

This invention was made with U.S. Government support under Contract No. N68335-08-C-0478 awarded by the United States Navy, Naval Air Warfare Center to Cornerstone Research Group, Inc. The U.S. Government has certain rights in the invention.

BACKGROUND OF THE INVENTION

1. Field of the Invention

The present invention relates to an acoustic noise absorbing device, and more particularly to a tunable resonant acoustic noise absorbing device.

2. Description of Related Art

Broadband acoustic liners are based on the mechanism of multiple cavity resonance. Bulk and cellular core structures are the most commonly used types.

The simplest acoustic liner is a single degree of freedom (SDOF) liner. The face sheet exposed to the sound is perforated and the bottom sheet is solid. SDOF designs are usually tuned to attenuate one octave and their tuning abilities are limited and fixed to one design point.

Multiple degree of freedom (MDOF) liners on the other hand are liners with multiple-layer sandwich construction. While multi-chamber liners are used to address broadband noise, SDOF are not broadband. The face sheet exposed to the sound is perforated and the bottom sheet is solid. Intermediate sheets or septum vary from perforates to screen-like material. MDOF designs are more complicated and are able to attenuate noise over a larger bandwidth. The current state-of-the-art in broadband acoustic liners is passive in implementation, fabricated with one attenuation design point.

One of the fundamental characteristics of each cavity or chamber within resonant liners is suppression of noise over a relatively narrow bandwidth. For SDOF liners, the useful bandwidth is approximately one octave. A MDOF liner has wider bandwidth than a SDOF liner. It is most effective when designed for two adjacent harmonics of blade passing frequency (BPF) or approximately two octaves. This is accomplished through selection of geometric properties for the chamber depth and face sheet and septum properties. The challenge to noise attenuation for example is suppressing noise generated by aircraft engines over several octaves.

There is a push in the industry to implement more dynamic technology in the liners making passive designs tunable. The Helmholtz Resonator concept is not new, and it has been documented extensively in the literature. However, the ability to accurately control the resonator dimensions, or volume throughout a variety of operating environments, is still in its infancy. One design of current Helmholtz resonators uses a compliant piezo-electric composite back plate. The piezo-electric material is placed in an RLC (resistive-inductive-capacitive) circuit. Compliance of the back plate is controlled through manipulation of this RLC circuit, allowing impedance of the electromechanical acoustic liner to be tuned in-situ. An interesting feature of this concept is that, although the Helmholtz resonator was constructed using a SDOF design, the compliant lower boundary had the effect of making the resonator behave like a MDOF design, broadening the effective frequency attenuation range. However, the two resonance frequencies produced by the piezo-electric back plate are not independently tunable.

Prior attempts at passive-adaptive noise control were made with a self-tuning Helmholtz resonator. This concept uses a resonator with a moving internal partition. The effect is to change the internal volume of the resonator. A tuning range of 100 Hz can be achieved with this design. Self-tuning can be enabled through a feedback loop microprocessor control system.

Not all adaptive designs feature physically moving or changing boundary conditions. Biasing air flow through the lining and changing the temperature of the air within the contained volume of the resonator has been used as methods to achieve active control. Biasing air flow seeks to change the impedance of the liner by affecting the impedance of the orifice. The effect on impedance of biasing airflow on the liner surface orifice is not as significant as it is for the septum orifice between two chambers as used in a MDOF design. Controlling the air flow through the septum showed the ability to tune the centering frequency of the resonator with desirable increases in impedance. Both positive and negative biasing airflows have been previously demonstrated. Sourcing of biasing airflow in the air intake of modern and future engine designs from bleed air will be seen as detrimental as it detracts from engine efficiency. The second option is to change the properties of the air inside the chamber by heating the air inside the camber. This adjusts the impedance through changing the normalization properties. Energy efficiency and small tuning range detract from the viability of this concept.

Passive liners are manufactured to a fixed design point, whereas active liners can change their design point post manufacture to suit multiple operating conditions. All acoustic liners currently in use in jet engine liners were found to be passive. The ability to control the acoustic impedance in-situ of a liner would provide a valuable tool to improve the performance of liners.

The ability to implement adaptive acoustic engine liners would be a benefit as the operating conditions of aircraft engines are variable, based on flight conditions and aircraft trim. Compromises are usually made in the design of passive liners in order to reach a design that is a best fit for multiple operating conditions. Adaptability of liner design in-situ will allow for a liner that is more capable of meeting Federal Aviation Association (FAA) mandated noise standards, for conditions such as approach, cutback and sideline.

SUMMARY OF THE INVENTION

Changing the depth of the resonance chamber(s) (SDOF or MDOF) of the liner and changing the orifice parameters of the face sheet and septum have the largest impact on the frequency dependent noise absorption properties of the acoustic liner. In-situ modification of these design parameters are targeted for achieving a tunable acoustic liner design.

Materials used in these liners must satisfy the mechanical, thermal, chemical and fatigue requirements for the liner application. Material systems currently in use are corrosion-resistant aluminums, titanium alloys, steels and carbon fiber-reinforced plastics. These materials are used for composing the structural aspects of the resonant liner. Materials chosen for the adaptive components of the resonant liner will be subjected to the same thermal and fatigue requirements as the structural members and should ideally be shape memory polymers (SMP) or composites. SMP offers the advantage of providing return force and the ability to reconfigure boundaries, or morphed state, at a desired position. Shape memory alloys and elastomers are also potential candidate material systems that offer proven methods for robust actuation.

This device integrates a controlled and repeatable shape change into the acoustic liner. The inherent material properties of the liner provide sufficient volume change.

The normal acoustic impedance of the resonant liner based on the depth of the cavity and parameters of the face sheet was modeled. Physical testing on a sample was performed to experimentally determine the normal acoustic impedance. A 1500 Hertz shift in the primary frequency of a liner was demonstrated through a change in depth of the acoustic lining. This demonstrated the use of air pressure to move a SMP diaphragm with a piston attached to it through a fifty percent (50%) reduction in chamber depth. Most commercial applications may only require a 500-600 Hertz tuning range, which has until now, eluded the industry.

BRIEF DESCRIPTION OF THE DRAWINGS

FIG. 4 is a perspective view of the resonance housing with the selectively flexible material in an activated state.

DETAILED DESCRIPTION OF EXEMPLARY EMBODIMENTS

Figure 1:
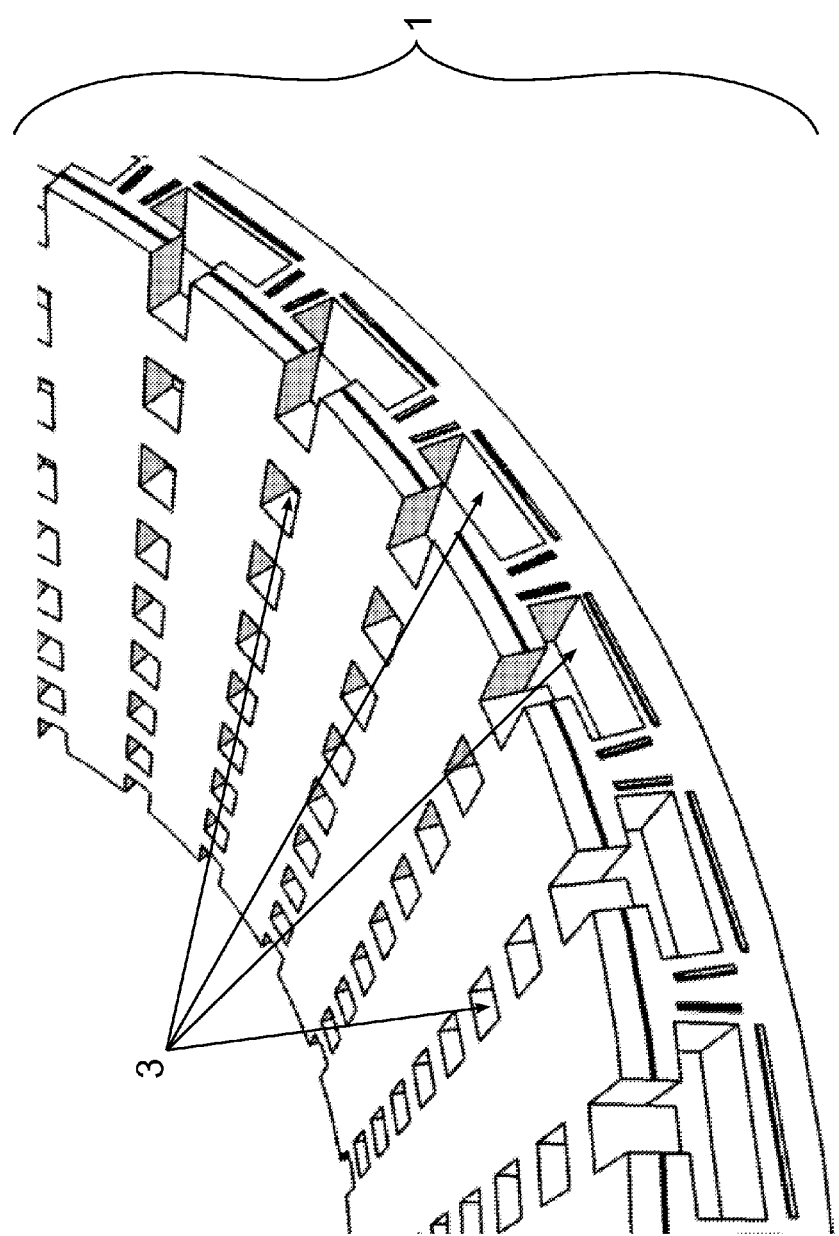
FIG. 1 is a perspective view of a plurality of resonance housings in an acoustic liner inside a jet engine.

Acoustic liner designs are used in modern jet aircraft to attenuate noise. There are two principal types of acoustic liners used in modern jet engines: bulk absorber liners and perforate liners. Tunable perforate acoustic liners can now be designed using shape memory materials, which allow the acoustic liners to tune for frequencies across a wide range, unlike current designs which are limited to specific frequencies or small ranges.

As used throughout this application adaptive liner means an acoustic liner that can change its acoustic characteristics, such as impedance, in-situ to better match the current operating conditions. As used throughout this application blade passing frequency (BPF) means the result of fan rotor/stator interaction. As used throughout this application bulk absorber means single layer construction. As used throughout this application grazing flow means air flow over liner surface, parallel to the surface. As used throughout this application Helmholtz Resonator means a device that exhibits the phenomenon of air resonating in a cavity. As used throughout this application Multiple Degree of Freedom (MDOF) Liner means multiple layer sandwich construction. Honeycomb or similar cellular core structures are most commonly used in this construction. As used throughout this application Passive Liner means acoustic liner that is fixed to a design point based on the geometry of its construction and its acoustic characteristics cannot be changed after manufacture. As used throughout this application Octave band means the range of frequencies where f2=2f1, and f1 is the lowest frequency in the band and f2 is the highest frequency. As used throughout this application ⅓ octave band means the range of frequencies where f2=2^(⅓) f1, and f1 is the lowest frequency in the band and f2 is the highest frequency. As used throughout this application Segmented Liner means the acoustic lining that features annular ring or segments with varying geometric properties and is designed to create discontinuities in the acoustic impedance of the surface. As used throughout this application Single Degree of Freedom (SDOF) Liner means a single layer sandwich construction.

The presently disclosed device is designed to dynamically change the acoustic attenuation point to adapt to changing acoustic environmental conditions.

Impedance of a resonant, perforate liner is controlled by the porous face sheet and the trapped cavity for a SDOF design and by the face sheet, intermediate septums and cavities for MDOF designs. The resistance portion of the impedance results primarily from the face sheet and septum. Face sheet and septum resistance are varied through porosity of the perforate or Rayl number for a mesh. Porosity is controlled by orifice size and orifice spacing. The reactance of the lining is primarily dictated by the cavity between the face and bottom sheets. There is a mass reactance associated with the air in orifice. However, this reactance can be small, especially for small orifices or lower frequencies. Reactance of the cavity or trapped air space is chiefly determined by the length of the air gap and temperature of the air in the gap. Controlling these parameters is the key to controlling overall liner sound absorption.

The resistance and mass reactance of the face sheet and septum are controlled by the size and spacing of the orifices. Reducing the number of orifices and/or the size of the orifices lowers the reactance associated with the liner due to the decrease in associated air mass. Reducing the number of orifices and/or decreasing their size tend to increase the resistance. This increase in resistance is due to the higher airflow velocity of air in and out of the orifice for a given sound pressure level. The magnitude of the resistance of the perforate surface shows some dependence on the frequency of the sound due to the decreased energy dissipation of viscous effects near the resonator chamber orifice at higher frequencies. Past work found on orifice size has shown that keeping perforate orifice size small, with the percent open area less than twenty percent results in liners with good resistance values over the range of frequencies of primary interest. Larger orifice openings have weaker sound absorption as opening size affects shedding, transmission and reflection coefficients. For broadband excitation (noise), small orifice openings are more efficient sound absorbers, whereas larger openings are more or less transparent to incident wave, even in the presence of grazing flow.

Reactance of the cavity is highly dependent on depth of the chamber. The most common way to adjust the reactance properties of a resonant liner to the desired frequency range is to change the depth of the cavity.

The design of these resonators can be completed by optimizing the few parameters governing the impedance once the desired frequencies to attenuate are known. The difficulty lies with the other, less tangible variables that the impedance depends upon. Liners are affected by: mean flow speed; mean flow boundary layer thickness; duct size; sound amplitude; sound frequency; face plate thickness; cavity depth; cavity cross-section area; perforate width; perforate length; and open area of perforates. The first five factors listed are consequences of the application and the effect of each on the final design can only be speculated upon before a finalized engine design exists. The last six factors represent dependent, physical dimensions of the liner, which are controllable parameters that depend upon other variables that may not be fully known.

SDOF liners have a solid bottom and an open top. MDOF liners are made of a solid composite or aluminum bottom, which is beneath one layer of honeycomb, and then a separation sheet with a second layer of honeycomb is placed on top, and finally a sheet with an orifice.

Figure 2:
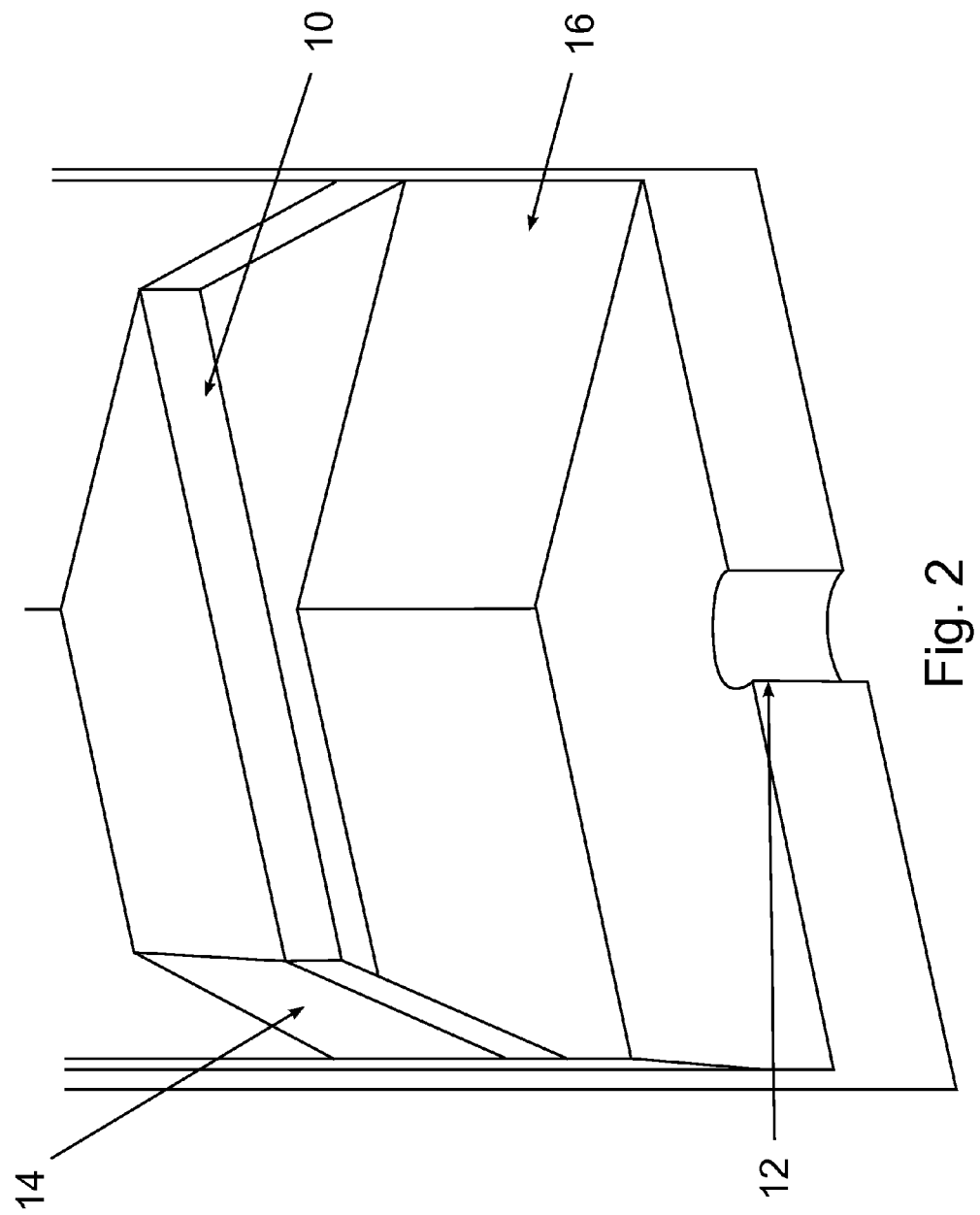
FIG. 2 is a perspective close up of the bottom of a resonance housing.

As shown in FIG. 1, a typical jet engine, 1, is fitted with acoustic liners, 3, spaced circumferentially throughout the nacelle. The currently disclosed design provides the ability to accurately control the resonator dimensions, or volume throughout various flight regimes. As seen in FIG. 2, a SMP-based material, 14, is placed in a resonator chamber where it may be activated and changed to a different shape. Shape change may occur through a variety of means, such as actuators, coefficient of thermal expansion (CTE), vacuum, air pressure, exposure to thermal, light, electromagnetic, or some other stimuli to dynamically change the modulus of the materials to provide the ability to change the acoustic attenuation point. SMP (Shape Memory Polymer) or SMP composite materials may or may not be used. Whatever the actuation mechanism may be, it would only need to occur over a short period of time, in most cases less than one minute or less. After actuation, the SMP layer is cooled and would remain in that configuration until another flight regime change, where it could then be activated and morphed to another volume size that tunes the resonator frequency. This process is repeatable, controllable, and reversible.

Figure 3:
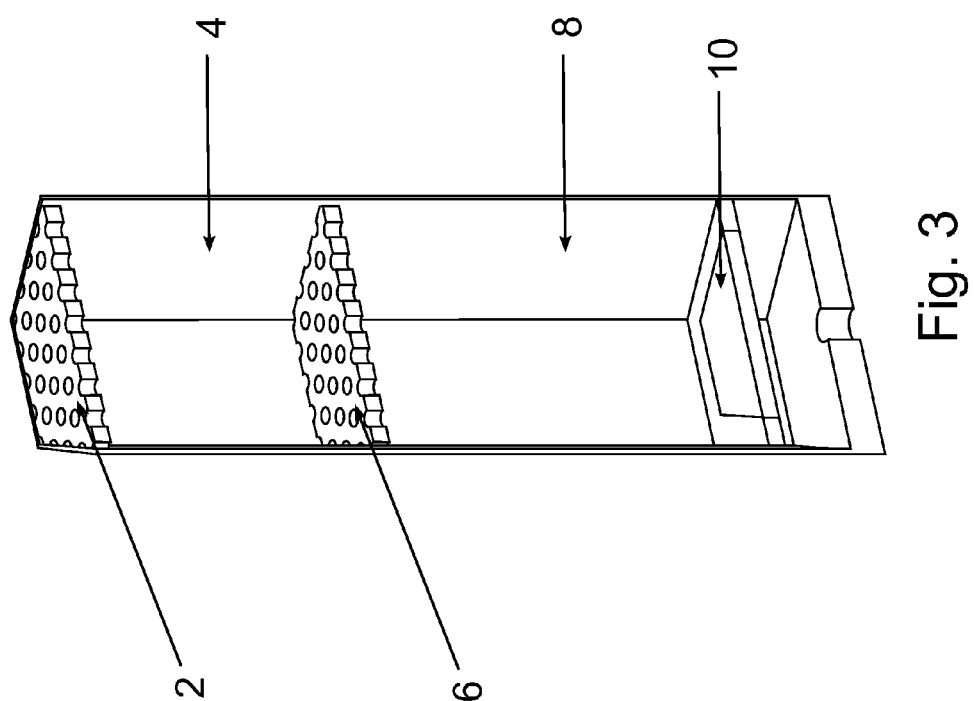
FIG. 3 is a perspective view of the resonance housing in its normal state.

As seen in FIGS. 2-4 the preferred embodiment is to translate the floor of the lower trapped air cavity in at least a two degree of freedom liner. With the proper design and control systems, this embodiment can have multiple degrees of freedom and be useful across a wide range of frequencies. As seen in FIGS. 2 and 4 the boundary of the lower air chamber, 16, is controlled by a diaphragm-like mechanism, 10. This mechanism in the lower cavity is sealed at the bottom by a rigid material, 10, surrounded at its edges by a selectively flexible or rigidizable material, 14, preferably SMP. The SMP is normally rigid but becomes flexible when desired to allow translation of the diaphragm. As seen in FIG. 2 a port, 12, below the bottom plate allows air to be forced into the sealed lower chamber, displacing the lower boundary of the lower air cavity upward. Vacuum could also be used to draw the diaphragm downward. FIGS. 3 and 4 show how the chamber has an upper entrance portion, 2, a middle septum, 6, an upper air chamber, 4, and a middle air chamber, 8. These figures show how the device changes the frequency of the chamber by moving the SMP, 14, and the rigid material, 10, up and down. Additionally the middle septum, 6 could be translated within the cavity. This would provide additional tunability within the liner system for increased applicability and efficiency.

Additionally, the possibility exists for conventional liner materials to be replaced by a Synlam structure, wherein Synlam is a syntactic sandwich core composite.

These resonator cavities can be integrated into the Synlam structure, where the liner is capable of being load bearing, so engine design can realize some weight savings while incorporating added noise canceling capability.

The liner will be initiated through a sensor and feedback loop to monitor the current acoustic environment and initiate geometry change needed to more effectively attenuate the engine noise.

Another embodiment is the use of the disclosed acoustic liner but manufactured at various design points. These various liners are integrated at predetermined locations across a desired surface area. This embodiment is designed to attenuate multiple frequencies simultaneously and use the variance in design for further noise canceling ability. The resonators are controlled through a control system and individually altered so as to attenuate each of the desired frequencies to provide the maximum overall noise reduction. The control system monitors the overall acoustic liners performance and makes corrections as needed for optimum acoustic noise attenuation. This embodiment will provide greater noise reduction as well increased tunability of the system for various environmental conditions.

It is important to note that while this device is described in reference to the preferred embodiment mentioned above; those of skill in the art will be able to design and manufacture other devices using the principles described herein to make tunable perforate acoustic liners which can be used in various applications.

In the preferred embodiment the tunable liner was able to shift the frequency of the chamber at least 500-600 Hz with a liner frequency switching time of less than one minute. With the proper designs, frequency shift of at least 2000 Hz is possible with greater or lesser switching times and liner core weights depending on the application and desired performance of the liner. These metrics are imperative to liner design in order for the technology to be integrated into another device, such as a jet engine, in order to reduce the noise generated.

What is claimed is:

1. A tunable resonant liner device comprising:
a housing containing at least one chamber with each chamber having at least one initial resonance frequency, wherein each said chamber is formed by an outer wall, a middle portion and an opening at the end of the chamber opposite to the middle portion, wherein said opening has at least one orifice formed therein for allowing a sound to transmit through the opening into said chamber and wherein said housing contains a second, lower chamber which is formed by said middle portion, said outer wall, and a bottom portion,
said middle portion is comprised of at least one rigid material connected to and surrounded by a selectively flexible material wherein said selectively flexible material is connected to said outer wall and an actuation means and said selectively flexible material can transition from a hard state to a soft state upon application of a stimulus, and
said selectively flexible material upon application of a stimulus transitions to a soft state and when said selective flexible material is in its said soft state the actuation means can move the selectively flexible material from one position to another, thereby moving the rigid material and changing the resonance frequency of said housing.

2. The tunable resonant liner device of claim 1 where said opening includes a plurality of orifices formed therein for allowing sound pressure waves to transmit through said opening into said upper chamber.

3. The tunable resonant perforate device of claim 1 wherein said bottom portion has at least one opening to allow pressure waves into said lower chamber.

4. The tunable resonant perforate device of claim 1 wherein changing the resonance frequency of said housing dynamically changes the acoustic attenuation characteristics of the housing.

5. The tunable resonant perforate device of claim 1 wherein said resonance frequency can be altered by at least 2000 hertz.

6. The tunable resonant perforate device of claim 1 wherein said resonance frequency can be altered by at least 1000 hertz.

7. The tunable resonant perforate device of claim 1 wherein said resonance frequency can be altered by at least 500 hertz.

8. The tunable resonant perforate device of claim 1 wherein the housing can be integrated into a Synlam structure such that the housing becomes load bearing.

9. The tunable resonant perforate device of claim 1 wherein said resonance frequency of said housing can be changed in less than thirty minutes.

10. The tunable resonant perforate device of claim 9 wherein said resonance frequency of said housing can be changed in less than one minute.

11. A tunable resonant perforate device comprising:

a plurality of housings each with an initial resonance frequency containing an upper chamber and a lower chamber, wherein said upper chamber is formed by an outer wall, a middle portion and an opening at the end of the upper chamber opposite to the middle portion, wherein said opening has at least one orifice formed therein for allowing a sound to transmit through the opening into said upper chamber and said lower chamber is formed by said middle portion, said outer wall, and a bottom portion, said middle portion is comprised of a at least one rigid material connected to and surrounded by a selectively flexible material wherein said selectively flexible material is connected to said outer wall and an actuation means and said selectively flexible material can transition from a hard state to a soft state upon application of a stimulus, said selectively flexible material upon application of a stimulus transitions to a soft state and when said selectively flexible material is in its said soft state the actuation means can move the selectively flexible material from one position to another, thereby moving the rigid material and changing the resonance frequency of said housing;

the plurality of housings are placed at predetermined geometric locations across a desired surface area to form an attenuating surface.

12. A tunable resonant perforate device of claim 11 wherein plurality of housings are individually controlled through a control system and individually altered so as to attenuate multiple frequencies to provide the maximum overall noise reduction.

13. The tunable resonant perforate device of claim 12 wherein the control system monitors the overall acoustic liners performance and makes corrections as needed for optimum acoustic noise attenuation.

* * * * *